(12) United States Patent
Yan et al.

(10) Patent No.: US 8,422,363 B2
(45) Date of Patent: Apr. 16, 2013

(54) METHOD AND APPARATUS FOR SERVICE PROTECTION

(75) Inventors: Jun Yan, Shenzhen (CN); Gen Chen, Shenzhen (CN); Bo Zhang, Shenzhen (CN); Da He, Shenzhen (CN); Yu Zeng, Shenzhen (CN); Zhenyu Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 320 days.

(21) Appl. No.: 12/848,099

(22) Filed: Jul. 31, 2010

(65) Prior Publication Data

US 2010/0296809 A1 Nov. 25, 2010

Related U.S. Application Data

(63) Continuation of application No. PCT/CN2009/070203, filed on Jan. 19, 2009.

(30) Foreign Application Priority Data

Feb. 4, 2008 (CN) .......................... 2008 1 0057688

(51) Int. Cl.
*G01R 31/08* (2006.01)
(52) U.S. Cl.
USPC ............................ 370/227; 370/225; 370/228
(58) Field of Classification Search .................. 370/225, 370/227, 228
See application file for complete search history.

(56) References Cited

U.S. PATENT DOCUMENTS

| | | | |
|---|---|---|---|
| 6,141,320 A | 10/2000 | Ikawa | |
| 2003/0174656 A1 | 9/2003 | Ernandez | |
| 2003/0229807 A1 | 12/2003 | Qiao | |
| 2005/0013241 A1 | 1/2005 | Beller | |
| 2005/0058060 A1 | 3/2005 | Caldwell | |
| 2005/0099941 A1* | 5/2005 | Sestito et al. | 370/228 |
| 2005/0163162 A1* | 7/2005 | Lanzone et al. | 370/471 |
| 2006/0050631 A1* | 3/2006 | Koyuncuoglu et al. | 370/217 |
| 2007/0086331 A1* | 4/2007 | Manral et al. | 370/223 |
| 2007/0211750 A1* | 9/2007 | Li et al. | 370/445 |
| 2008/0069563 A1 | 3/2008 | Wang | |
| 2008/0095535 A1* | 4/2008 | Zou | 398/58 |
| 2009/0169217 A1* | 7/2009 | Meagher et al. | 398/140 |

FOREIGN PATENT DOCUMENTS

| | | |
|---|---|---|
| CN | 1295397 A | 5/2001 |
| CN | 1870480 A | 11/2006 |
| CN | 101114880 A | 1/2008 |
| CN | 101350679 A | 1/2009 |
| EP | 1511665 A1 | 4/2004 |

OTHER PUBLICATIONS

International search report of the corresponding patent application No. PCT/CN2009/070203, dated on Apr. 30, 2009.

(Continued)

*Primary Examiner* — Jason Mattis
(74) *Attorney, Agent, or Firm* — Slater & Matsil, LLP

(57) ABSTRACT

A method and apparatus for realizing service protection are provided. The method includes the following steps: determining paths corresponding to automatic protection switching (APS)/protection communication channel (PCC) overhead bytes that are available to all nodes in a service protection trail; selecting a path for service protection from the determined paths corresponding to the APS/PCC; and using the selected path for implementing the service protection. Therefore, it is ensured that several service protections using APS/PCC may coexist in an optical transport network (OTN) and different kinds of service protection can be easily distinguished from one another.

12 Claims, 7 Drawing Sheets

OTHER PUBLICATIONS

ITU T Recommendation G.709/Y.1331,Series G: Transmission Systems and Media, Digital Systems and Networks Digital terminal equipments—General, Series Y: Global Information Infrastructure, Internet Protocol Aspects and Next Generation Networks Internet protocol aspects—Transport, Interfaces for the Optical Transport Network (OTN) (Mar. 2003).

Written Opinion of corresponding PCT Patent Application No. PCT/CN2009/070203, mailed on Apr. 30, 2009, 4 pages total.

Search report of corresponding European patent application No. EP09708248.1 ,Mailed on Jul. 15, 2011,5 pages total.

ITU T Recommendation G.873.1:"Series G: Transmission Systems and Media, Digital Systems and Networks Digital networks—Optical transport networks Optical Transport Network (OTN): Linear protection",dated Mar. 2003,24 pages total.

\* cited by examiner

METHOD AND APPARATUS FOR SERVICE PROTECTION

CROSS-REFERENCE TO RELATED APPLICATIONS

This application is a continuation of International Application No. PCT/CN2009/070203, filed on Jan. 19, 2009, which claims priority to Chinese Patent Application No. 200810057688.1, filed on Feb. 4, 2008, both of which are hereby incorporated by reference in their entireties.

FIELD OF THE TECHNOLOGY

The present application relates to the field of communication technology, and more particularly to a method and an apparatus for service protection.

BACKGROUND OF THE INVENTION

Optical transport network (OTN), developed from synchronous optical network (SONET)/synchronous digital hierarchy (SDH) technology, is a new optical transport technology. It has a relatively good service scheduling capability, networking capability and service protection capability, and is a backbone transport network of the next generation.

With the development of the OTN technology, in order to effectively improve the survivability of services, various types of OTN service protection techniques are provided. Examples of the techniques include optical channel data unit (ODU) shared protection ring (SPRing) suitable for distributed service application scenarios, and ODUk subnetwork connection protection (SNCP) most commonly used by the OTN electrical layer.

In practical applications, several service protections may be configured and used at the same time on a trail of ODUk (where, k may be set to 1, 2, 3, . . . to represent levels, and rates are varied for different levels). Moreover, these kinds of service protection may all need to use an automatic protection switching (APS) protocol. However, in the ODUk frame structure, only four APS/protection communication channel (PCC) overhead bytes can be used for indicating different kinds of service protection. Therefore, how to divide the APS/PCC for multiple service protections becomes a problem to be solved at the present.

In the existing technology, the APS/PCC is divided through multiframes. Particularly, the APS/PCC is divided according to different values of the sixth, seventh, and eighth bits of a multiframe alignment signal (MFAS), so that the APS/PCC is equally divided into 8 parts, and different kinds of connection service monitoring corresponding to the APS/PCC paths after the division and available service protections are set.

However, in actual applications, several ODUk subnetwork connections/non-intrusive monitoring (SNC/N) may perform path monitoring (PM) on the entire ODUk path at the same time, which may result in nesting relations between several service protections, as shown in FIGS. 1 and 2. In this case, according to the standards defined in the prior art, the ODUk SNC/N is assigned with only one APS/PCC value, and is specified with only one service protection path. Therefore, the above-mentioned different ODUk SNC/N service protections may not be distinguished from one another.

In addition, it is not explicitly stated in the prior art the path corresponding to the APS/PCC of which multiframe value that can be used during the ODUk SPRing service protection. If the standards defined in the prior art are used, contention of the paths corresponding to the APS/PCC as shown in FIG. 3 may be caused, and what's worse, nesting relations between several service protections as shown in FIG. 4 may also occur, so that the service protections cannot be easily distinguished from one another.

SUMMARY OF THE INVENTION

In order to solve the above technical problems, the present invention provides a method and an apparatus for realizing a service protection, so that several service protections may coexist in an OTN and different kinds of service protection can be easily distinguished from one another.

In an embodiment, the present invention provides a method for realizing a service protection, which includes:
determining paths corresponding to APS/PCC that are available to all nodes in a service protection trail;
selecting a path for the service protection from the determined paths corresponding to the APS/PCC; and
providing the service protection using the selected path.

In an embodiment, the present invention further provides an apparatus for realizing a service protection. The apparatus includes an available path determining module, a path selecting module, and a service protecting module.

The available path determining module is configured to determine paths corresponding to APS/PCC that are available to all nodes in a service protection trail.

The path selecting module is configured to select a path for a service protection from the paths corresponding to the APS/PCC determined by the available path determining module.

The service protecting module is configured to use the path selected by the path selecting module for implementing the service protection.

It can be seen from the technical solutions of the present invention that, in the embodiments of the present invention, paths corresponding to APS/PCC that are available to all nodes in a service protection trail are determined, a path for a service protection is selected from the determined paths corresponding to the APS/PCC, and the selected path is used for implementing the service protection. Therefore, it is ensured that several service protections using the APS/PCC may coexist in an OTN and different kinds of service protection can be easily distinguished from one another.

DETAILED DESCRIPTION OF THE EMBODIMENTS

Figure 1:
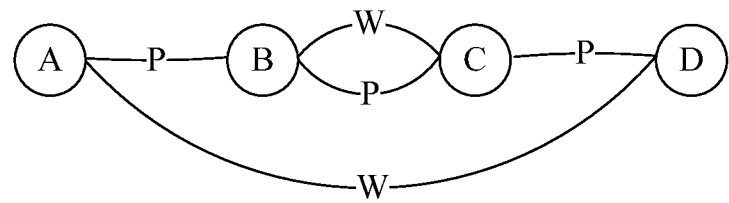
FIG. 1 is a first schematic diagram of nesting relations occurring to various kinds of service protection in the prior art.
Figure 2:
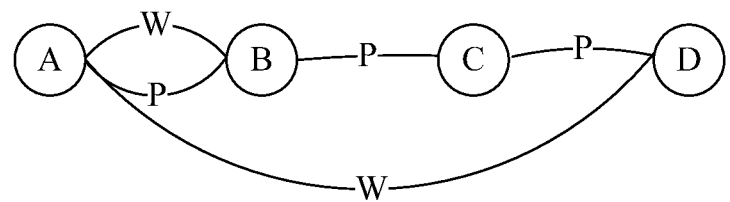
FIG. 2 is a second schematic diagram of nesting relations occurring to various kinds of service protection in the prior art.

In the method for service protection according to an embodiment of the present invention, the APS/PCC overhead bytes are divided into several parts evenly, preferably 8 parts, through multiframes, and the byte content of the APS/PCC of all multiframes is initialized to zero. It should be noted that, in the method for realizing the service protection according to the present invention, the service monitoring mode and service protection adopted by a path corresponding to the divided APC/PCC are not specified. Any service monitoring mode may use any of the paths corresponding to the divided APS/PCC, and any service monitoring mode may use any kind of service protection.

In the method for realizing the service protection according to the present invention, the specific forms of the divided APS/PCC are as shown in Table 1.

TABLE 1

| Sixth, seventh, and eighth bits of MFAS | Connection service monitoring corresponding to APS/PCC path | Service protection available to APS/PCC path |
| --- | --- | --- |
| 0 0 0 | Any service monitoring mode | Any kind of service protection |
| 0 0 1 | Any service monitoring mode | Any kind of service protection |
| 0 1 0 | Any service monitoring mode | Any kind of service protection |
| 0 1 1 | Any service monitoring mode | Any kind of service protection |
| 1 0 0 | Any service monitoring mode | Any kind of service protection |
| 1 0 1 | Any service monitoring mode | Any kind of service protection |
| 1 1 0 | Any service monitoring mode | Any kind of service protection |
| 1 1 1 | Any service monitoring mode | Any kind of service protection |

Since in the actual applications, nesting or overlapping of the service protections may not occur frequently, in the method for the service protection according to the present invention, the APS/PCC may also be divided into 4 or 2 parts through the multiframes.

In the method for realizing the service protection according to the present invention, the byte content of the APS/PCC of all multiframes may be initialized to zero by using an ODUkP/Client_A_So function. And, it is determined whether the APS/PCC of a multiframe has already been used by checking whether the byte content of the APS/PCC of the received multiframes (may be 2 or 3 frames, or other number of frames) is zero all the time, so that the use condition of a certain APS/PCC after the division is obtained, and the use condition of a path corresponding to the APS/PCC is thus determined.

In a specific application of the method for realizing the service protection according to the present invention, firstly, a particular node in a certain service protection trail is selected and configured. Since the method is applicable to the ODUk SPRing and the ODUk SNCP, the selected node may be a source node or a sink node in the SNCP, or any node on the protection ring in the SPRing. It is understandable that, the service protection that the method of the present invention can be applied to is not limited to the above, and the details thereof may not be given herein again.

When a certain node is selected, service units used by protected services in receiving and transmitting directions of the node are configured, and working units and protecting units in the receiving and transmitting directions of the node are configured.

Specifically, the service units, the working units, and the protecting units may be tributary units or line units.

The process of configuring the units specifically includes: selecting an ODUk of a slot, an interface and a path in the service units, the working units, and the protecting units used by the protected services in the receiving and transmitting directions of the node.

For the SNCP, one working unit and one protecting unit may be configured in the receiving direction and the transmitting direction, respectively.

For the SPRing, two working units and two protecting units may be configured in the receiving direction and the transmitting direction, respectively, in which one working unit and one protecting unit are for westward delivery, while one working unit and one protecting unit are for eastward delivery.

It should be noted that, the configuration of the above units may be implemented regardless of the sequence, that is, may be implemented simultaneously or separately.

When the configuration of the above units is completed, the use condition of the path corresponding to the APS/PCC that is available to all the nodes in the service protection trail is queried, that is, it is determined whether a path corresponding to a certain idle APS/PCC exists.

Specifically, for the SNCP, the use condition of the paths corresponding to the APS/PCC of all the nodes in the service protection trail needs to be comprehensively queried, and only the path corresponding to a certain APS/PCC for which the source node, the sink node, and all the other nodes are idle may be used by the source node and the sink node to implement the service protection operation. For the SPRing, the use condition of the APS/PCC paths for all the nodes in the protection ring network needs to be queried, and only the path corresponding to a certain APS/PCC for which all the nodes are idle may be used by a particular node in the protection ring network to implement the service protection operation.

When a path corresponding to the APS/PCC that satisfies the above conditions is queried, the path corresponding to the APS/PCC is simultaneously configured to the receiving and transmitting directions of the node.

After the configuration of the path corresponding to the APS/PCC for the node is completed, the system may perform a checking operation on resources that are determined to be used, including the node itself and the path corresponding to the APS/PCC, so as to judge whether any use relation that may cause conflict still exists. Specifically, during the configuration of a path corresponding to a certain APS/PCC for a selected node, it is checked whether the node and the configured path corresponding to the APS/PCC are used by other kinds of service protection. If the use relation that may cause conflict does not exist, the check is passed; otherwise, the check is failed.

Till now, the configuration of a certain node in the service protection is completed. At this point, if the service protection still has other nodes to be configured, the above operations of selecting a node, configuring the node, querying and configuring for the node a path corresponding to a certain APS/PCC, and checking whether any use conflict exists between the used resources are repeatedly performed. Generally, for the SNCP, the source node and the sink node need to be configured; while for the SPRing, multiple nodes need to be configured.

After the completion of the above operations of selecting a node, configuring the node, querying and configuring for the node a path corresponding to a certain APS/PCC, and checking whether any use conflict exists between the used resources for all the nodes in a certain kind of service protection, related service crossing may be configured by the system automatically or by a user. It should be noted that, the configuration of the related service crossing by the system or by the user may also be implemented before or during the above operations.

For ease of understanding, different application scenarios of the method for realizing the service protection according to the present invention are described in detail below with the accompanying drawings.

Figure 5A:
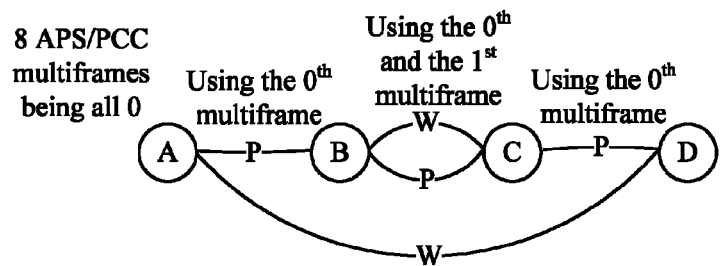
FIG. 5A is a schematic diagram illustrating a first application example of the method according to an embodiment of the present invention.
Figure 5B:
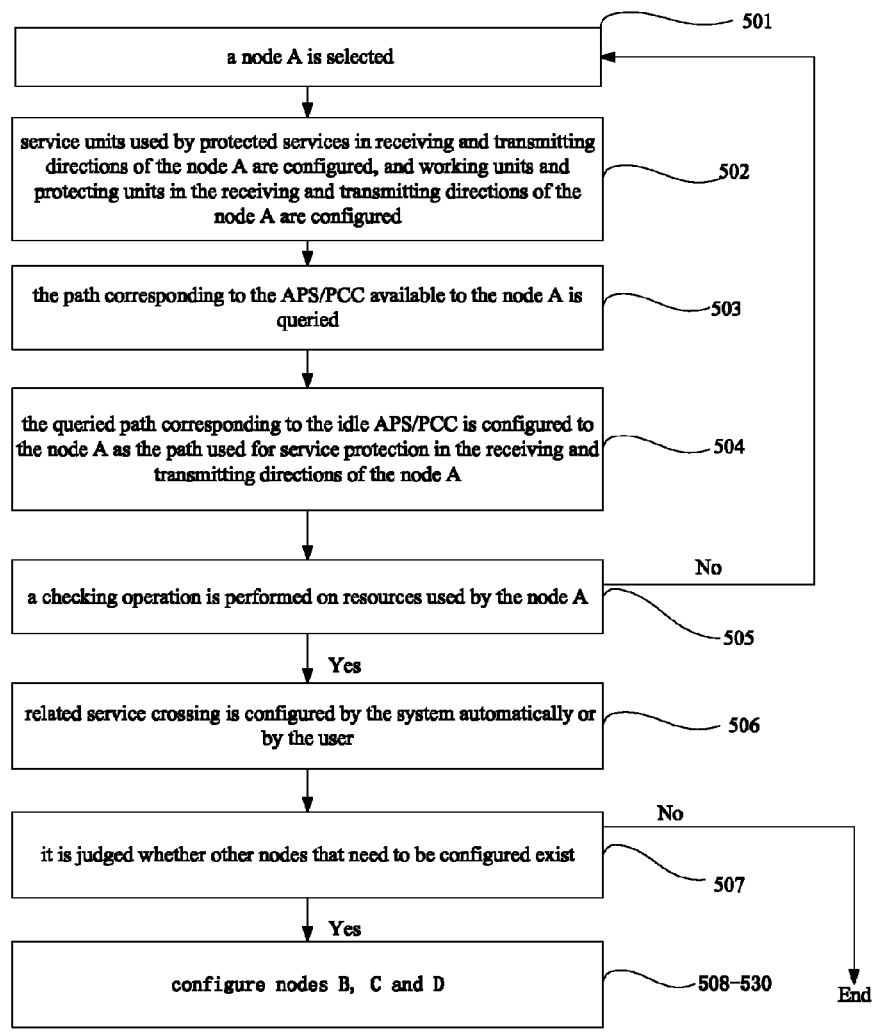
FIG. 5B is a flow chart of the application example.

The method for realizing the service protection according to the present invention is applied to a ODUk SNCP with different source nodes. As shown in FIG. 5A, for example, one kind of SNCP exists between nodes A and D, and another kind of SNCP exists between nodes B and C. The specific implementation process includes the following steps, as shown in FIG. 5B.

In Step 501, a node A is selected.

The node A is a source node, and it can be configured first.

In Step 502, service units used by protected services in receiving and transmitting directions of the node A are configured, and working units and protecting units in the receiving and transmitting directions of the node A are configured.

In this step, an ODUk of a slot, an interface and a path to be used by the service units, the working units, and the protecting units in the receiving and transmitting directions of the node A may be selected, for example, the ODUk of slot 3, optical interface 1, and path 1 in the above-mentioned units is selected.

In Step 503, the path corresponding to the APS/PCC available to the node A is queried.

In this step, only the path corresponding to a certain APS/PCC for which all the nodes are idle in the service protection trail is queried, which can be used by the node A.

In the embodiment of the present invention, it is determined whether the path corresponding to a certain APS/PCC is in a state of idle or being used by judging whether several continuous frames of the byte content of a certain APS/PCC that is received by the nodes A, B, C, and D are all zero (the process of initializing the byte content of the APS/PCC to zero may be implemented before selecting the node, and the initialization process is as described above, the details of which may not be given herein again), and a path corresponding to a certain idle APS/PCC is selected as the path used for service protection.

For example, if a path corresponding to an APS/PCC for which the sixth, seventh, and eighth bits of the MFAS are 000 is idle at all the nodes A, B, C, and D, the node A may select the path corresponding to the APS/PCC as the path used for service protection.

In Step 504, the queried path corresponding to the idle APS/PCC is configured to the node A as the path used for service protection in the receiving and transmitting directions of the node A.

In this step, the queried path corresponding to the idle APS/PCC, for example, the path corresponding to the APS/PCC for which the sixth, seventh, and eighth bits of the MFAS are 000, may be configured by a user or by the system automatically to the node A as the path used for service protection in the receiving and transmitting directions of the node A.

Alternatively, the system may automatically select a path corresponding to the APS/PCC as the path used for service protection of the node A according to arbitrary rules from the paths corresponding to the idle APS/PCC.

After the path corresponding to the idle APS/PCC is assigned for use by a certain kind of service protection, the byte content of the APS/PCC may be written to non-zero in the service protection, indicating that the APS/PCC is already in use.

In Step 505, a checking operation is performed on resources used by the node A.

In this step, the system may perform a checking operation on the resources that are determined to be used by the node A, including the node A itself and the path corresponding to the APS/PCC configured to be used by the node A in Step 504, so as to judge whether the node A and the path corresponding to the APS/PCC configured to be used by the node A in Step 504 are used by other kinds of service protection.

If the use relation that may cause conflict does not exist, the check is passed, and Step 506 is performed; otherwise, Step 501 is performed.

In Step 506, related service crossing is configured by the system automatically or by a user.

In Step 507, it is judged whether other nodes that need to be configured exist.

Since the SNCP from the node A to the node D is applied, after the configuration of the source node A is completed, the sink node D still needs to be configured, and Step 508 is performed.

In Step 508, the node D is selected.

The configuration of the node D (Steps 508 to 513) is similar to that of the node A (Steps 501 to 506), so the details thereof may not be given herein again.

In Step 514, it is judged whether other nodes that need to be configured exist.

Since the configuration of the source node (node A) and the sink node (node D) of a certain SNCP is completed, it is judged that no node in the SNCP needs to be configured, and Step 515 is performed, in which the determined path corresponding to the APS/PCC is used to implement the SNCP.

Since the SNCP also exists for the nodes B and C, the source node B and the sink node C both need to be configured.

In Step 516, the node B is selected.

In Step 517, service units used by protected services in receiving and transmitting directions of the node B are configured, and working units and protecting units in the receiving and transmitting directions of the node B are configured.

In this step, an ODUk of a slot, an interface and a path to be used by the service units, the working units, and the protecting units in the receiving and transmitting directions of the node B may be selected, for example, the ODUk of slot 2, optical interface 2, and path 2 in the above-mentioned units is selected.

In Step 518, the path corresponding to the APS/PCC available to the node B is queried.

In this step, only the path corresponding to a certain APS/PCC for which all the nodes are idle in the service protection trail is queried, which can be used by the node B.

In the embodiment of the present invention, it is determined whether the path corresponding to a certain APS/PCC is in a state of idle or being used by judging whether several continuous frames of the byte content of a certain APS/PCC that is received by the nodes B and C are all zero, and a path corresponding to a certain idle APS/PCC is selected as the path used for service protection.

Since the SNCP with the source node A and the sink node D passes through the nodes B, C, and the SNCP has selected the path corresponding to the APS/PCC for which the sixth, seventh, and eighth bits of the MFAS are 000 to be used for service protection, the node B and the node C judge through the received signal that the path corresponding to the APS/PCC for which the sixth, seventh, and eighth bits of the MFAS are 000 is already used, so that the node B may select the paths corresponding to other APS/PCCs that are idle at both the node B and the node C as the path used for service protection, for example, the path corresponding to an idle APS/PCC for which the sixth, seventh, and eighth bits of the MFAS are 001.

In Step 519, the queried path corresponding to the idle APS/PCC is configured to the node B as the path used for service protection in the receiving and transmitting directions of the node B.

This step is the same as Step 504.

In Step 520, a checking operation is performed on resources used by the node B.

This step is the same as Step 505.

If the check is passed, Step 521 is performed; otherwise, Step 516 is performed.

In Step 521, related service crossing is configured by the system automatically or by the user.

In Step 522, it is judged whether other nodes that need protection configuration exist.

Since the SNCP from the node B to the node C is applied, after the configuration of the source node B is completed, the sink node C still needs to be configured, and Step 523 is performed.

In Step 523, the node C is selected.

The configuration of the node C (Steps 523 to 528) is similar to that of the node B (Steps 516 to 521), so the details thereof may not be given herein again.

In Step 529, it is judged whether other nodes that need protection configuration exist.

Since the configuration of the source node (node B) and the sink node (node C) of a certain SNCP is completed, it is judged that no node in the SNCP needs to be configured, and Step 530 is performed, in which the determined path corresponding to the APS/PCC is used to implement the SNCP.

After Steps 501 to 530 are performed, the result is as shown in FIG. 5A. It can be seen from FIG. 5A that, the ODUk SNCP between the node A and the node D uses the path corresponding to the APS/PCC for which the sixth, seventh, and eighth bits of the MFAS are 000, and the ODUk SNCP between the node B and the node C uses the path corresponding to the APS/PCC for which the sixth, seventh, and eighth bits of the MFAS are 001, in which two paths corresponding to the APS/PCC exist between the node B and the node C at the same time. Although nesting relations still occur between various kinds of service protection, since the paths used by these kinds of service protection are different, the problem that different kinds of service protection cannot be distinguished is avoided.

Figure 6:
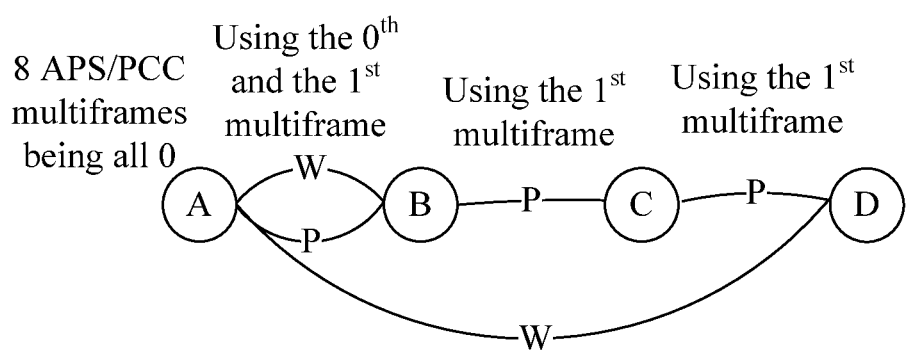
FIG. 6 is a schematic diagram illustrating a second application example of the method according to the embodiment of the present invention.

The application of the method for realizing service protection according to the present invention in the ODUk SNCP with the same source nodes is similar to the application of the method in the ODUk SNCP with different source nodes, so the details thereof may not be given herein again. The result of the method for realizing service protection according to the present invention applied to the ODUk SNCP with the same source nodes is shown in FIG. 6.

The method for realizing service protection according to the present invention may also be applied to an ODUk SPRing, and if no service protection is ongoing in the current ODUk SPRing, any node in the ODUk SPRing may adopt the path corresponding to any APS/PCC after being divided for the service protection.

Figure 3:
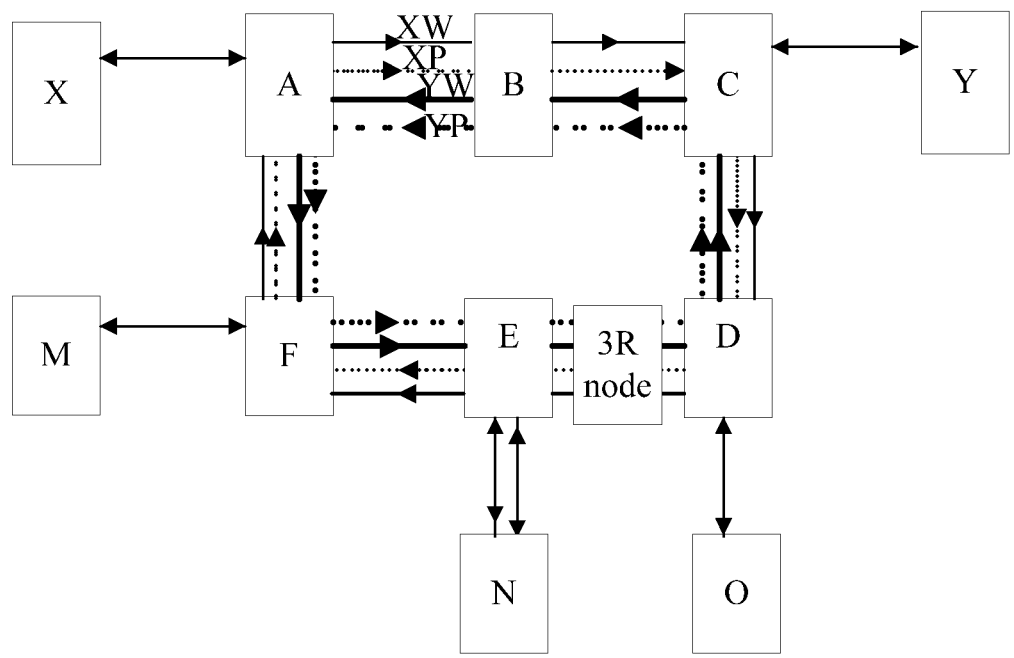
FIG. 3 is a third schematic diagram of nesting relations occurring to various kinds of service protection in the prior art.
Figure 4:
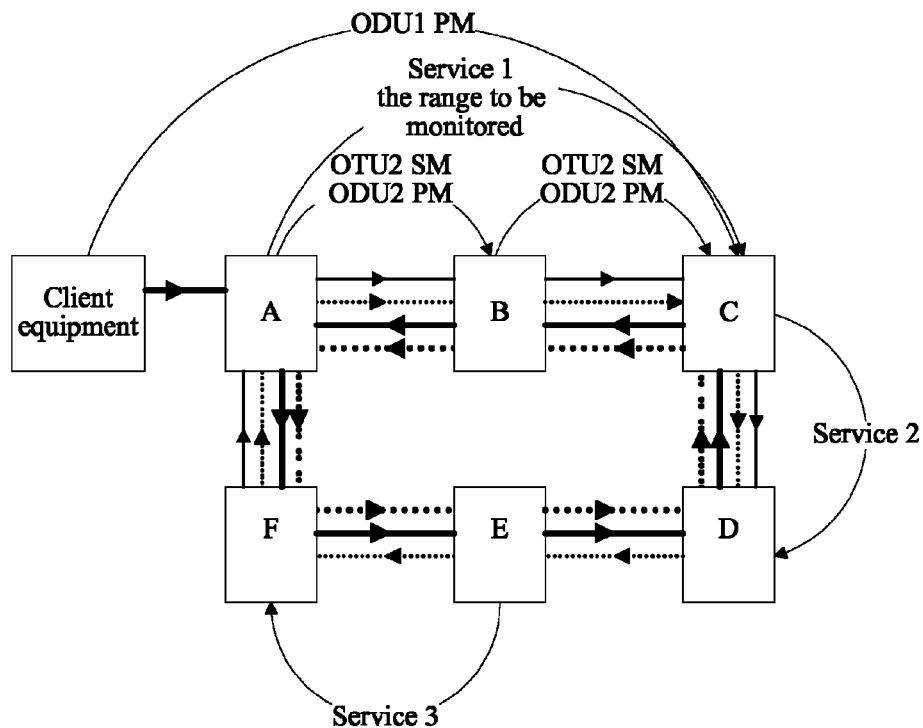
FIG. 4 is a fourth schematic diagram of nesting relations occurring to various kinds of service protection in the prior art.
Figure 7A:
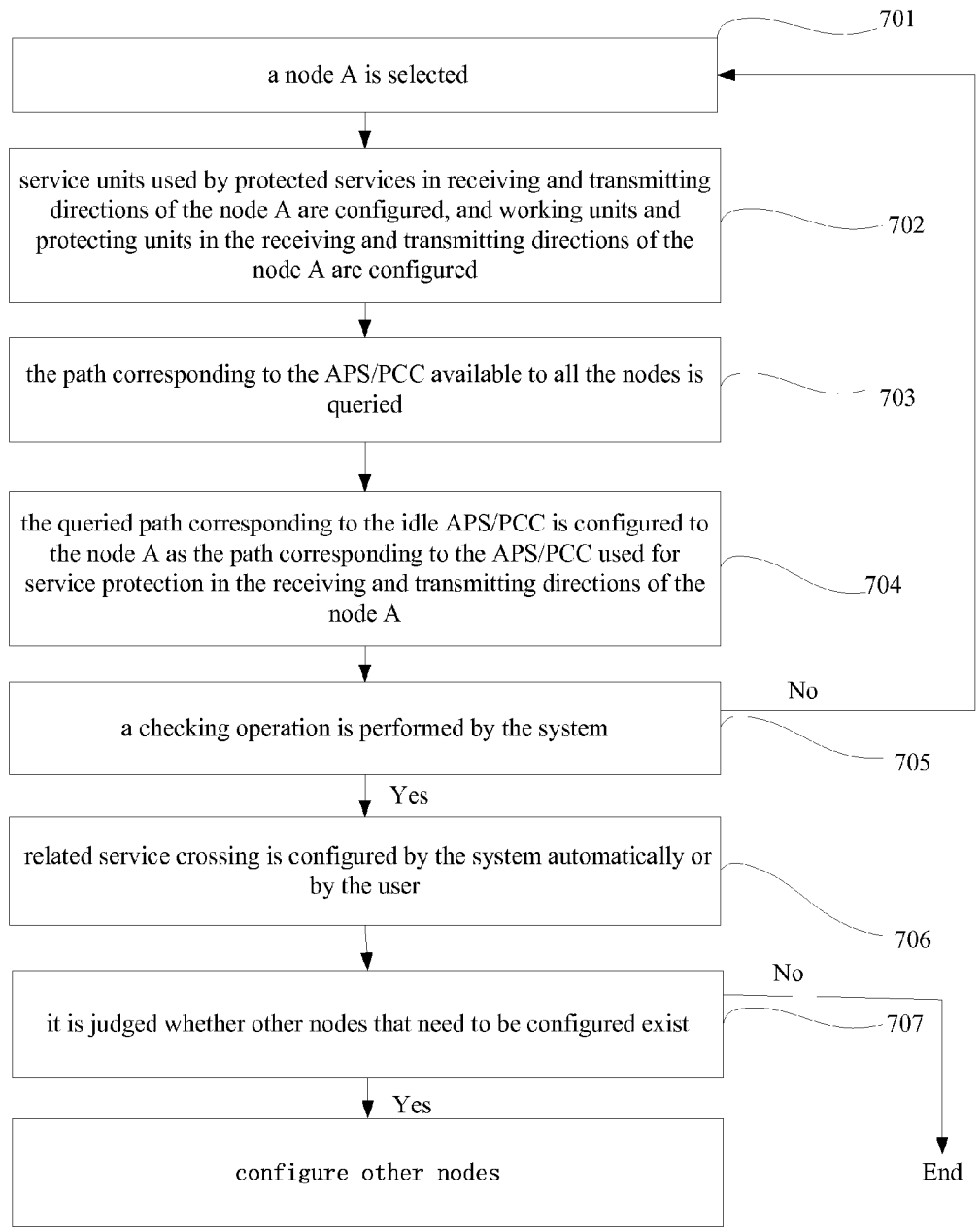
FIG. 7A is a flow chart of a third application example of the method according to the embodiment of the present invention.

If the current ODUk SPRing is in a networking case as shown in FIG. 3, and nodes A, B, C, D, E, and F are six nodes on the ring network protection ring, in which one ODUk from a node X to a node Y (the protection path goes through the nodes X, A, B, C, and Y) adopts the path corresponding to the APS/PCC for which the sixth, seventh, and eighth bits of the MFAS are 000, one ODUk from a node M to a node N (the protection path goes through the nodes M, F, E, and N) adopts the path corresponding to the APS/PCC for which the sixth, seventh, and eighth bits of the MFAS are 001, and one ODUk from the node N to a node O (the protection path goes through the nodes N, E, D, and O) adopts the path corresponding to the APS/PCC for which the sixth, seventh, and eighth bits of the MFAS are 010, when a kind of ring network protection covering all the nodes is needed, the specific implementation of the method of the present invention may include the following steps, as shown in FIG. 7A.

In Step 701, a node A is selected.

Since the embodiment of the present invention is applied to ring network protection, any node in the ring network may be chosen for configuration.

In Step 702, service units used by protected services in receiving and transmitting directions of the node A are configured, and working units and protecting units in the receiving and transmitting directions of the node A are configured.

Specifically, in the configuring process, an ODUk of a slot, an interface and a path in the service units, the working units, and the protecting units in the receiving and transmitting directions of the node A is selected, for example, the ODUk of slot 1, optical interface 3, and path 3 in the above-mentioned units is selected.

In Step 703, the path corresponding to the APS/PCC available to all the nodes is queried.

Since three kinds of service protection already exist in the ring network, and the trails of the three service protection paths are (X, A, B, C, Y), (M, F, E, N), and (N, E, D, O), respectively, for the node A, the signal entering the node A adopts the path corresponding to the APS/PCC for which the sixth, seventh, and eighth bits of the MFAS are 000; for the node B, the signal entering the node B adopts the path corresponding to the APS/PCC for which the sixth, seventh, and eighth bits of the MFAS are 000; for the node C, the signal entering the node C adopts the path corresponding to the APS/PCC for which the sixth, seventh, and eighth bits of the MFAS are 000; for the node D, the signal entering the node D adopts the path corresponding to the APS/PCC for which the sixth, seventh, and eighth bits of the MFAS are 010; for the node E, the signal entering the node E from the node N to be sent to the node D adopts the path corresponding to the APS/PCC for which the sixth, seventh, and eighth bits of the MFAS are 010, the signal entering the node E from the node F to be sent to the node N adopts the path corresponding to the APS/PCC for which the sixth, seventh, and eighth bits of the MFAS are 001; and for the node F, the signal entering the node F adopts the path corresponding to the APS/PCC for which the sixth, seventh, and eighth bits of the MFAS are 001. It can be seen from the cases of all the nodes that, the paths corresponding to the APS/PCCs for which the sixth, seventh, and eighth bits of the MFAS are 000, 001, and 010 are adopted, and if the APS/PCC is divided into 8 multiframes, the paths corresponding to 5 idle APS/PCCs are still available for all the nodes in the ring network.

In Step 704, the queried path corresponding to the idle APS/PCC is configured to the node A as the path corresponding to the APS/PCC used for service protection in the receiving and transmitting directions of the node A.

Since it is determined that the node A may select the paths corresponding to the APS/PCCs other than the APS/PCCs for which the sixth, seventh, and eighth bits of the MFAS are 000, 001, and 010 after Step 703 is completed, the paths corresponding to the idle APS/PCCs may be selected by a user or by the system automatically, for example, the path corresponding to the APS/PCC for which the sixth, seventh, and eighth bits of the MFAS are 011 is selected as the path used for service protection in the receiving and transmitting directions of the node A.

Meanwhile, the byte content of the APS/PCC for which the sixth, seventh, and eighth bits of the MFAS are 011 is written to non-zero in the service protection, indicating that the APS/PCC is already used.

In Step 705, a checking operation is performed by the system.

After the path corresponding to the APS/PCC for which the sixth, seventh, and eighth bits of the MFAS are 011 is configured for the node A as the path used for service protection in the receiving and transmitting directions of the node A, the system checks the resources determined to be used by the node A, including the node A itself and the path corresponding to the APS/PCC for which the sixth, seventh, and eighth bits of the MFAS are 011, so as to judge whether any use relation that may cause conflict due to the fact that the resources are used by other kinds of service protection exists between the node A and the path corresponding to the APS/PCC for which the sixth, seventh, and eighth bits of the MFAS are 011.

If the check is passed, Step 706 is performed; otherwise, Step 701 is performed.

In Step 706, related service crossing is configured by the system automatically or by the user.

In Step 707, it is judged whether other nodes that need to be configured exist.

The configuration of other nodes is similar to that of the node A, and the details thereof may not be given herein again.

Figure 7B:
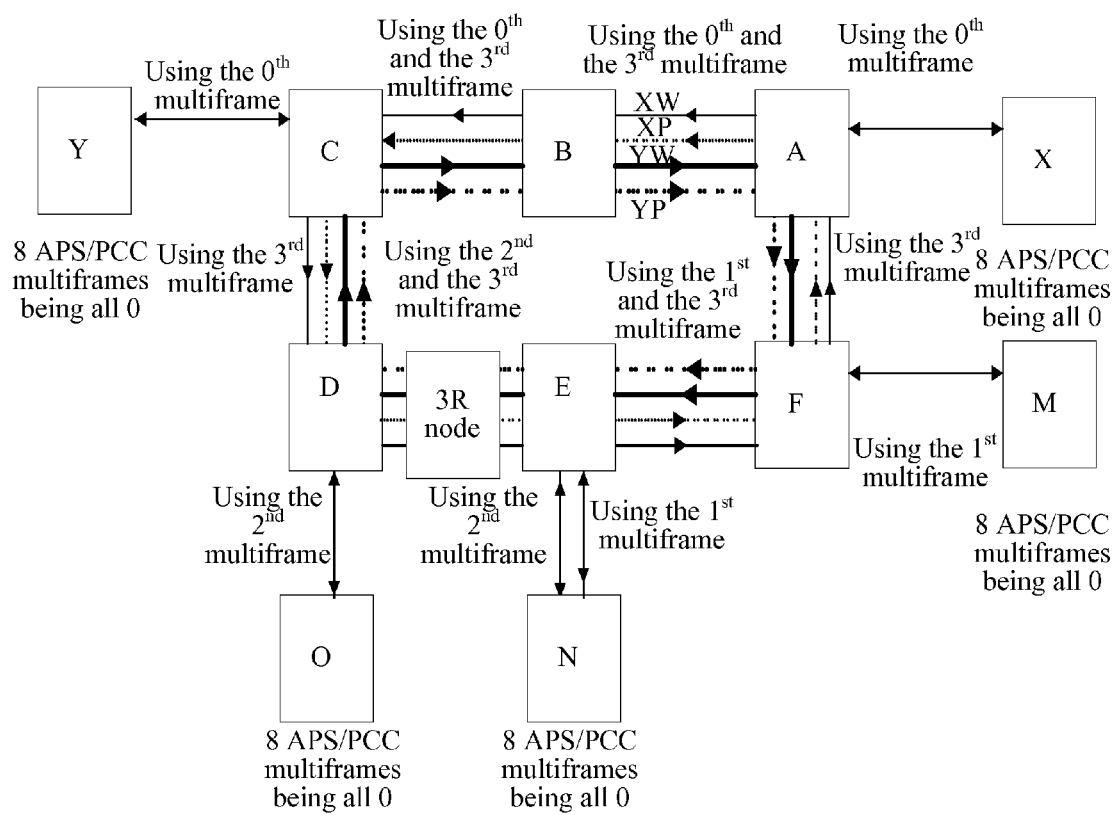
FIG. 7B is a schematic diagram illustrating the application example.

After the configuration is completed, the final result is as shown in FIG. 7B. The path corresponding to the APS/PCC for which the sixth, seventh, and eighth bits of the MFAS are 011 is used for the service protection among the node A, the node B, and the node C. The path corresponding to the APS/PCC for which the sixth, seventh, and eighth bits of the MFAS are 000 is used for other kinds of service protection from the node X to the node Y. The path corresponding to the APS/PCC for which the sixth, seventh, and eighth bits of the MFAS are 011 is used for the ring network protection between the node C and the node D. The path corresponding to the APS/PCC for which the sixth, seventh, and eighth bits of the MFAS are 011 is used for the ring network protection between the node D and the node E. The path corresponding to the APS/PCC for which the sixth, seventh, and eighth bits of the MFAS are 010 is used for other kinds of service protection from the node N to the node O. The path corresponding to the APS/PCC for which the sixth, seventh, and eighth bits of the MFAS are 011 is used for the ring network protection between the node E and the node F. The path corresponding to the APS/PCC for which the sixth, seventh, and eighth bits of the MFAS are 001 is used for other kinds of service protection from the node M to the node N. In this manner, the problem that different kinds of service protection cannot be distinguished is avoided.

In the method for realizing service protection according to the present invention, after the APS/PCC is divided into several parts through multiframes, the service monitoring mode and service protection employed by the path corresponding to a certain APC/PCC is not specified, so that when several service protections exist in the OTN, a path corresponding to an idle APS/PCC can be selected for each kind of service protection, and the problem that different kinds of service protection cannot be distinguished is avoided.

Figure 8:
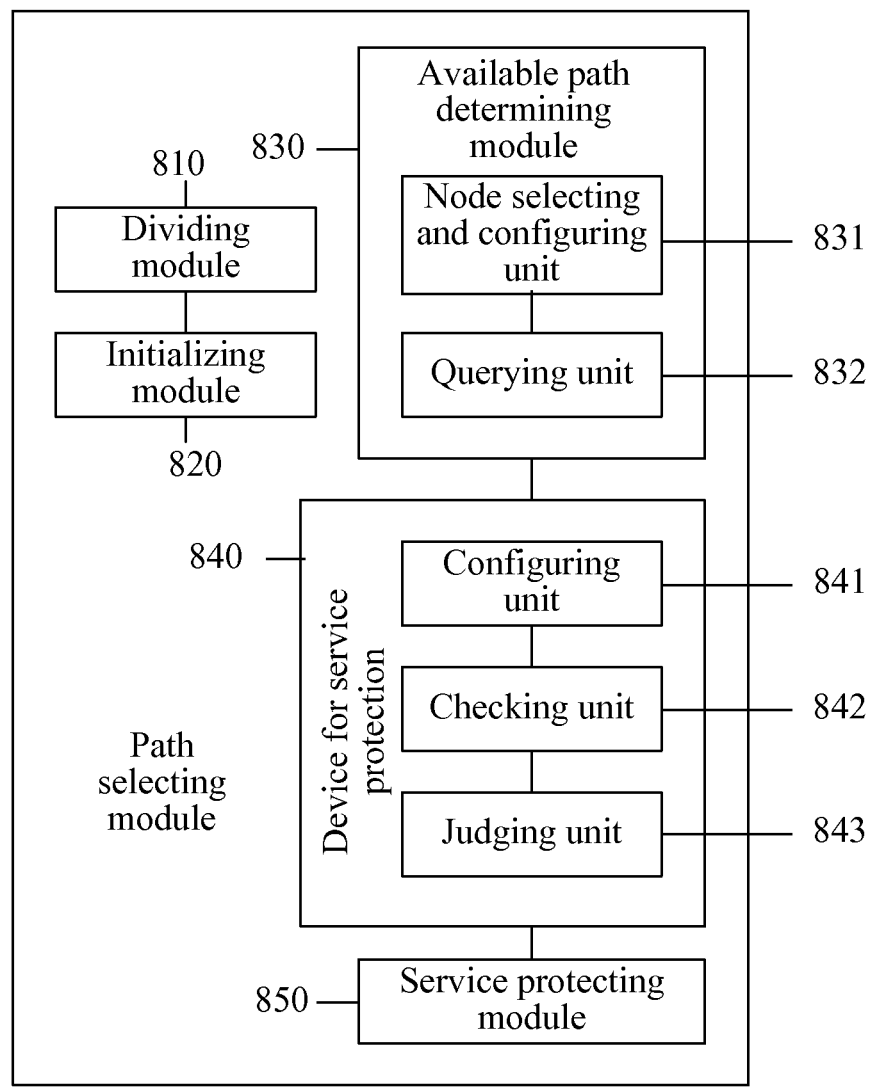
FIG. 8 is a block diagram of the apparatus according to an embodiment of the present invention.

In an embodiment, the present invention provides an apparatus for service protection. As shown in FIG. 8, the apparatus includes a dividing module 810, an initializing module 820, an available path determining module 830, a path selecting module 840, and a service protecting module 850.

1) The dividing module 810 is configured to divide an APS/PCC into several parts through multiframes.

Specifically, the dividing module 810 may divide the APS/PCC into 8, 4, or 2 parts through multiframes.

The dividing module 810 does not specify the service monitoring mode and service protection used by the path corresponding to a certain APC/PCC after dividing the APS/PCC into several parts, which indicates that, in the apparatus for service protection according to the present invention, any service monitoring mode can adopt any path corresponding to the APS/PCC after being divided by multiframes, and any service monitoring mode can adopt any kind of service protection.

2) The initializing module 820 is configured to initialize the byte content of each part of the idle APS/PCC after being divided by the dividing module to zero.

The initializing module 820 may initialize the byte content of each part of the APS/PCC after being divided to zero by using an ODUkP/Client_A_So function.

3) The available path determining module 830 is configured to determine paths corresponding to the APS/PCC that are available to all nodes in a service protection trail.

Specifically, the available path determining module 830 includes a node selecting and configuring unit 831 and a querying unit 832.

The node selecting and configuring unit 831 is configured to select a node under service protection, and configure the node.

The node selecting and configuring unit 831 is configured to select a special node in a certain kind of service protection, configure service units used by protected services in receiving and transmitting directions of the node, and configure working units and protecting units in the receiving and transmitting directions of the node, which may be, specifically, selecting an ODUk of a slot, an interface and a path in the service units, the working units, and the protecting units.

The querying unit 832 is configured to determine whether the path corresponding to a certain APS/PCC is available by querying whether several continuous frames of the byte content of a certain APS/PCC after being divided that is received by all the nodes in the service protection trail are all zero.

4) The path selecting module 840 is configured to select a path for service protection from the paths corresponding to the APS/PCC determined by the available path determining module.

Specifically, the path selecting module 840 includes a configuring unit 841, a checking unit 842, and a judging unit 843.

The configuring unit 841 is configured to configure the path corresponding to a certain idle APS/PCC queried by the querying unit 832 to the node selected by the node selecting and configuring unit 831 as the path used for service protection by the node.

The checking unit 842 is configured to check whether the node selected to be used by the node selecting and configuring unit 831 and the path corresponding to a certain APS/PCC determined to be used by the configuring unit 833 are used by other kinds of service protection.

The judging unit 843 is configured to judge whether other nodes on which the node selection and configuration need to be performed exist in the service protection and determine an operation of the path corresponding to the APS/PCC, after the check of the checking unit 834 is passed.

5) The service protecting module 850 is configured to select the path corresponding to the APS/PCC determined by the checking determining unit 832 for service protection.

In the apparatus for service protection of the present invention, after the APS/PCC is divided into several parts through multiframes, the service monitoring mode and service protection employed by the path corresponding to a certain APC/PCC is not specified, so that when several service protections exist in the OTN, a path corresponding to an idle APS/PCC can be selected for each kind of service protection, and the problem that different kinds of service protection cannot be distinguished is avoided.

In conclusion, the above are merely preferred embodiments of the present invention. However, the scope of the present invention is not limited thereto. Changes or replacements readily apparent to persons skilled in the prior art within the technical scope of the present invention should fall within the scope of the present invention. Therefore, the protection scope of the present invention is subject to the appended claims.

What is claimed is:

1. A method for realizing a service protection, the method comprising:
    determining one or more idle automatic protection switching (APS)/protection communication channel (PCC) paths that are available to all nodes in a service protection trail, wherein the one or more idle APS/PCC paths are determined based on contents of multiframe alignment signal (MFAS) and APS/PCC overhead bytes of received respective multiframes in an optical channel data unit k (ODUk) frame structure, wherein each of the received respective multiframes in the ODUk frame structure includes an overhead field of MFAS and an overhead field of APS/PCC containing corresponding MFAS and APS/PCC overhead bytes, wherein each idle APS/PCC path is associated with one of several values indicated by at least a portion of contents in the overhead field of MFAS and is allowed to be dynamically assigned to any service monitoring mode and any kind of service protection;
    selecting any APS/PCC path for a certain kind of service protection from the determined one or more idle APS/PCC paths; and
    using the selected path for implementing service protection.

2. The method according to claim 1, wherein determining one or more idle APS/PCC paths comprises:
    querying all APS/PCC paths in use in the service protection trail, wherein the all APS/PCC paths in use are associated with first overhead values of MFAS; and
    determining that at least one APS/PCC path associated with a second overhead value of MFAS other than the first overhead values of MFAS is idle.

3. The method according to claim 1, wherein determining one or more idle APS/PCC paths comprises:
    determining whether a certain APS/PCC path associated with a first overhead value of MFAS is idle based on APS/PCC overhead bytes associated with the first overhead value of MFAS.

4. The method according to claim 1, wherein after an APS/PCC path associated with a certain overhead value of MFAS is selected, APS/PCC overhead bytes associated with the certain overhead value of MFAS are set non-zero.

5. An apparatus for realizing service protection, the apparatus comprising:
    an available path determining module, configured to determine one or more idle automatic protection switching (APS)/protection communication channel (PCC) paths that are available to all nodes in a service protection trail, wherein the one or more idle APS/PCC paths are determined based on contents of multiframe alignment signal (MFAS) and APS/PCC overhead bytes of received respective multiframes in an optical channel data unit k (ODUk) frame structure, wherein each of the received respective multiframes in the ODUk frame structure includes an overhead field of MFAS and an overhead field of APS/PCC containing corresponding MFAS and APS/PCC overhead bytes, wherein each idle APS/PCC path is associated with one of several values indicated by at least a portion of contents in the overhead field of MFAS and is allowed to be dynamically assigned to any service monitoring mode and any kind of service protection;
    a path selecting module, configured to select any path for a certain kind of service protection from the one or more idle APS/PCC paths determined by the available path determining module; and
    a service protecting module, configured to use the path selected by the path selecting module for implementing service protection.

6. The apparatus according to claim 5, further comprising:
    a dividing module, configured to divide the APS/PCC overhead bytes in the ODUk frame structure into 8, 4, or 2 parts through multiframes; and
    an initializing module, configured to initialize byte content of APS/PCC overhead bytes of idle APS/PCC after being divided by the dividing module to zero.

7. The apparatus according to claim 5, wherein the available path determining module comprises:
    a node selecting and configuring unit, configured to select a certain node in the service protection trail, and configure the certain node; and
    a querying unit, configured to determine whether a certain APS/PCC path is available by querying whether byte contents of the APS/PCC overhead bytes in several continuous frames that are received by all the nodes in the service protection trail are all zero.

8. The apparatus according to claim 5, wherein the path selecting module comprises:
    a configuring unit, configured to configure the selected APS/PCC path to a certain node for service protection by the certain node; and
    a checking unit, configured to check whether the certain node and the selected APS/PCC path are used by other kinds of service protection.

9. An apparatus in an optical transport network (OTN) comprising a processor configured to:

determine one or more idle automatic protection switching (APS)/protection communication channel (PCC) paths that are available in a service protection trail based on received multiframes in an optical channel data unit k (ODUk) frame structure, wherein the ODUk frame structure includes a multiframe alignment signal (MFAS) overhead and an APS/PCC overhead, wherein the APS/PCC overhead is divided into several parts for several APS/PCC paths through multiframes, wherein each of the several APS/PCC paths is associated with one of several values of the MFAS overhead and is allowed to be dynamically assigned to any service monitoring mode and any kind of service protection;

select an APS/PCC path for any given kind of service protection from the determined one or more idle APS/PCC paths; and use the selected path for implementing service protection.

10. The apparatus according to claim 9, wherein the processor is configured to determine the one or more idle APS/PCC paths by:

querying all APS/PCC paths in use in the service protection trail, wherein the all APS/PCC paths in used are associated with first values of the MFAS overhead; and determining that at least one APS/PCC path associated with a second value of the MFAS overhead other than the first values of the MFAS overhead is idle.

11. The apparatus according to claim 9, wherein the processor is configured to determine whether a certain APS/PCC path associated with a first value of a first overhead of MFAS is idle based on a second overhead of APS/PCC associated with the first value of the first overhead of MFAS.

12. The apparatus according to claim 9, wherein the processor is configured to set a certain APS/PCC overhead associated with a certain value of the MFAS overhead as to be non-zero after an APS/PCC path associated with the certain value of the MFAS overhead is selected.

* * * * *